No. 670,597. Patented Mar. 26, 1901.
W. T. POWERS.
AGITATOR FOR CALCINING KETTLES.
(Application filed Feb. 10, 1900.)
(No Model.)
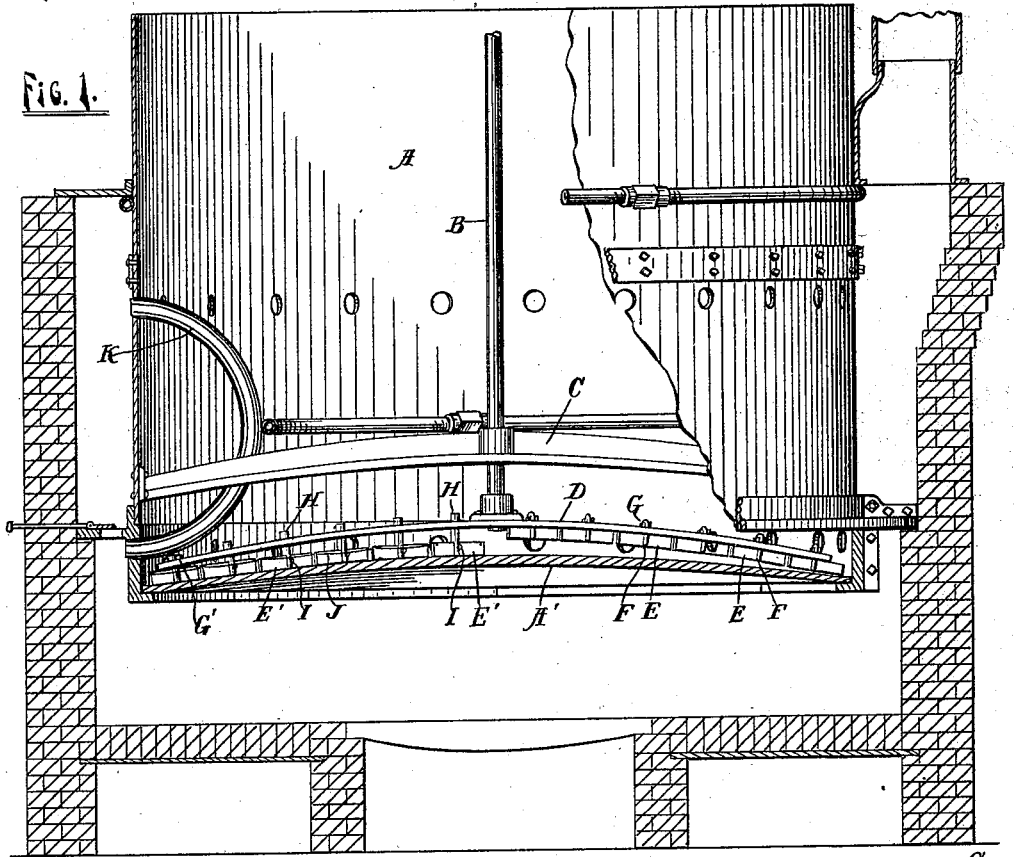
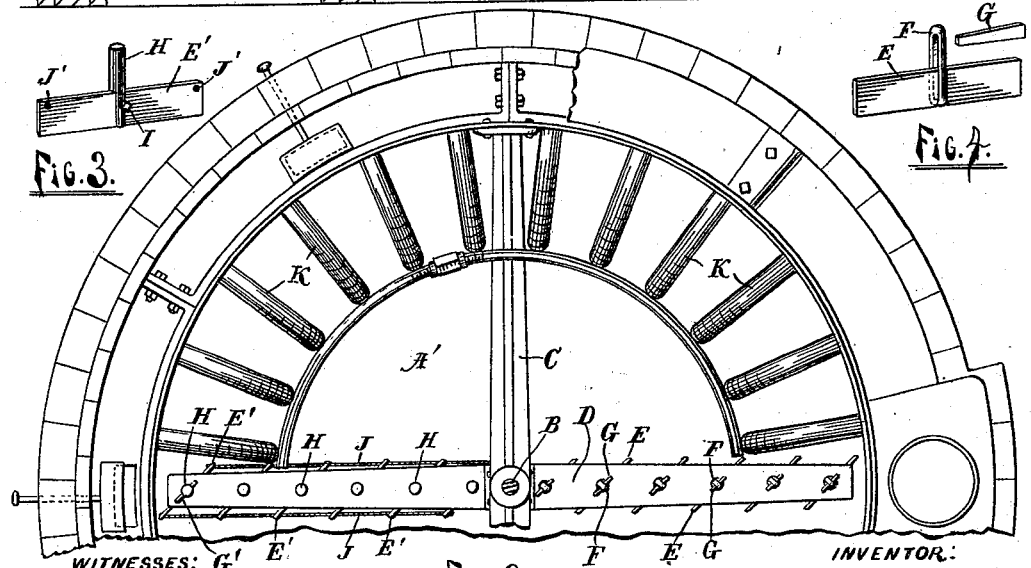
WITNESSES:
Palmer A. Jones.
Miles V. Easterly
INVENTOR:
William T. Powers.
By Luther V. Moulton
His Attorney
THE NORRIS PETERS CO., PHOTO-LITHO., WASHINGTON, D. C.

UNITED STATES PATENT OFFICE.

WILLIAM T. POWERS, OF GRAND RAPIDS, MICHIGAN.

AGITATOR FOR CALCINING-KETTLES.

SPECIFICATION forming part of Letters Patent No. 670,597, dated March 26, 1901.

Application filed February 10, 1900. Serial No. 4,833. (No model.)

*To all whom it may concern:*

Be it known that I, WILLIAM T. POWERS, a citizen of the United States, residing at Grand Rapids, in the county of Kent and State of Michigan, have invented certain new and useful Improvements in Agitators for Calcining-Kettles; and I do hereby declare the following to be a full, clear, and exact description of the invention, such as will enable others skilled in the art to which it appertains to make and use the same.

My invention relates to improvements in agitators for calcining-kettles; and its object is to provide the same with means whereby the paddles of the agitator will traverse the bottom of the kettle in close contact therewith to remove all of the material resting thereon and at the same time yield vertically to accommodate the rise of the bottom due to expansion of the same by heat, as hereinafter more fully described.

My invention consists in providing the device with a sweep rotating above the bottom of the kettle and having attached thereto vertically-yielding paddles engaging and traversing the surface of the bottom, as hereinafter more fully described, and particularly pointed out in the claims, reference being had to the accompanying drawings, in which—

Figure 1 represents a side elevation of a calcining-kettle with a portion broken away to show the construction and containing my improved device. Fig. 2 is a plan view of the same with portions broken away; Fig. 3, a detail of one of the automatically-adjustable paddles, and Fig. 4 a detail of one of the non-adjustable paddles.

Like letters refer to like parts in all of the figures.

A represents the body or shell of the kettle, having a detached concavo-convex bottom A' and a series of inwardly-projecting flues K inserted in the sides.

B is a shaft arranged vertically in the axis of the kettle and provided with any convenient means of rotation.

C is a bridge-bar in the kettle, in which the lower end of the shaft is journaled, which shaft terminates below the bridge-bar and at a distance from the bottom A'. To the lower end of this shaft is attached a sweep D, consisting of a flat bar of steel having a curvature somewhat greater than the curvature of the bottom A' and located at a suitable distance therefrom, said bar being provided with a series of openings at regular intervals for attaching paddles, as hereinafter described. The paddles E, attached to one half of the sweep D, are secured rigidly to the under side of the sweep by means of links F, which surround the middle of each paddle and extend upward through the said openings in the sweep D and are secured by keys or wedges G, passing through the upper ends of the links, as shown. The outer paddle of this series runs close to the rim of the bottom A', which rim does not rise when the bottom expands. The inner paddles of this series are held sufficiently above the bottom to permit the same to rise by expansion without contacting the same. The series of paddles E', attached to the other half of the sweep rest at their lower edges upon the surface of the bottom A' and traverse the same and are inserted in longitudinal slots in the lower ends of the vertically-movable pins H, passing through the openings in the sweep D and both rotative and vertically movable therein, and the paddles are secured within the pins H by screws I. The paddle in this series at the end of the sweep runs close to the bottom and is secured rigidly and adjustably to the sweep by means of a key G'. The remaining paddles of the series are connected to the end paddle at their respective outer ends and at an equal distance from each other by means of chains J J, whereby they are held at proper inclination to the sweep and parallel with the outer paddle P' and at the same time free to rise and fall vertically to conform to the expansion and contraction of the bottom A'.

From the foregoing description the operation of my device will be readily understood. When the shaft B is rotated, the paddles tend to move the contents of the kettle toward the periphery thereof, and the paddles E' resting upon the bottom A' and rising and falling therewith as it expands and contracts will at all times wholly remove the contents of the kettle from the surface of the bottom. As the contents of the kettle are thus moved outward they rise along the outside of the kettle between the flues K and are heated thereby and thence pass inward toward the axis of the kettle and downward again near the shaft B, thus maintaining a rapid circulation and preventing any of the contents of the kettle from remaining in contact with the bottom A' and becoming overheated thereby.

Having thus fully described my invention, what I claim, and desire to secure by Letters Patent, is—

1. The combination of a kettle having a convex bottom, a sweep rotative above the bottom a paddle rigidly secured to the end of the sweep and traversing close to the rim of the bottom, a series of vertically-movable paddles traversing the bottom and in contact therewith and means for connecting the vertically-movable paddles with the first-named paddle, whereby the entire series of paddles are held parallel substantially as described.

2. The combination of a kettle having a convex bottom, a sweep rotative above the bottom, a series of paddles rigidly attached to one half of the sweep, a paddle rigidly and adjustably attached to the outer end of the other half of the sweep, a series of paddles contacting the bottom and attached to pins rotative and vertically movable in the sweep, and means for connecting the last-named paddles with the rigidly and adjustably attached paddle, substantially as described.

3. The combination of a kettle having a convex bottom, a sweep of greater curvature than the bottom, a series of paddles adjustably attached to one half of the sweep, a paddle at the outer end of the other half of the sweep having a pin rotative in the sweep and a key passing through the pin, to adjust and hold the same, a series of paddles contacting the bottom, and attached to pins vertically movable and rotative in the sweep, and chains connecting the last-named paddles with the paddle on the outer end of the sweep substantially as described.

In testimony whereof I affix my signature in presence of two witnesses.

WM. T. POWERS.

Witnesses:
GEO. A. HALL,
PALMER A. JONES.